(12) United States Patent
Ghosh et al.

(10) Patent No.: US 10,885,477 B2
(45) Date of Patent: Jan. 5, 2021

(54) DATA PROCESSING FOR ROLE ASSESSMENT AND COURSE RECOMMENDATION

(71) Applicant: Accenture Global Solutions Limited, Dublin (IE)

(72) Inventors: Bhaskar Ghosh, Bangalore (IN); Srikanth Nr, Bangalore (IN); Rajendra T. Prasad, Bangalore (IN); Shankaranand Mallapur, Mumbai (IN); Sarvesh Madhusudan Damle, Thane (IN); Prashant Bhadre, Pune (IN); Anandakrishnan Rajaram, Chembur (IN); Mohan Sekhar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 15 days.

(21) Appl. No.: 16/042,719

(22) Filed: Jul. 23, 2018

(65) Prior Publication Data

US 2020/0027050 A1 Jan. 23, 2020

(51) Int. Cl.
*G06Q 10/06* (2012.01)
*G06N 20/00* (2019.01)

(52) U.S. Cl.
CPC ... *G06Q 10/0631* (2013.01); *G06Q 10/06398* (2013.01); *G06N 20/00* (2019.01)

(58) Field of Classification Search
None
See application file for complete search history.

(56) References Cited

U.S. PATENT DOCUMENTS 6,882,723 B1 * 4/2005 Peterson ............ G06Q 10/0639
379/265.01
2004/0002039 A1 * 1/2004 Draper ................. G06Q 10/063
434/118

(Continued)

OTHER PUBLICATIONS

Malone, T.B. "Reverse Engineering Allocation of Function Methodology for Reduced Manning (REARM)." United States, Department of Defense, CSERIAC. Improving Function Allocation for Integrated Systems Design, Eds. D. Beevis, P. Essens, and H. Schuffel. 1996. State-of-the-Art Report, OMB 0704-0188. (Year: 1996).*

(Continued)

*Primary Examiner* — Christine M Behncke
*Assistant Examiner* — Abhijit B Sadananda
(74) *Attorney, Agent, or Firm* — Harrity & Harrity, LLP

(57) ABSTRACT

A device receives a command to identify an automation evaluation for a role, determines tasks of the role based on data relating to the role, and determines activities for the tasks based on the data relating to the role. The device determines one or more automation scores, which correspond to a suitability for automation of the activities, based on a set of characteristics of the activities and based on the data relating to the role. The automation scores are determined using a machine learning model to parse natural language descriptions of the activities and score parsed portions of the natural language descriptions. The device generates, for the role, an aggregate automation score based on the automation scores, determines the automation evaluation for the role based on the aggregate automation score and characteristics of an entity associated with the role, and performs an action relating to the automation evaluation.

20 Claims, 11 Drawing Sheets

(56) References Cited

U.S. PATENT DOCUMENTS

| | | | |
|---|---|---|---|
| 2011/0126111 A1* | 5/2011 | Gill | G06F 21/55 |
| | | | 715/736 |
| 2013/0110733 A1* | 5/2013 | Mohanty | G06Q 10/105 |
| | | | 705/320 |
| 2015/0127567 A1* | 5/2015 | Menon | G06Q 10/1053 |
| | | | 705/321 |
| 2017/0068922 A1* | 3/2017 | Singh | G06Q 10/063112 |
| 2017/0076246 A1* | 3/2017 | Volkov | G06N 5/04 |
| 2017/0076296 A1* | 3/2017 | Hirpara | G06Q 10/06316 |
| 2017/0139762 A1* | 5/2017 | Sherlock | H04L 41/0654 |

OTHER PUBLICATIONS

Drigas, A., Kouremenos, S., Vrettos, S., Vrettaros, J., Kouremenos, D. "An expert system for job matching of the unemployed." Expert Systems with Applications, vol. 26, 2004, pp. 217-224. (Year: 2004).*

* cited by examiner

Automation Evaluation User Interface 128

Select your current role:

Test Architecture Specialist

Role description:

Develop strategic plans for testing efforts. Advise customers on innovative testing products and solutions. Demo and administer standard testing architecture methodologies...

Tasks Identified:

Identification of testing practices
Replication of testing practices

Activities:

Attend test conference.
Prepare presentation of testing.
Determine testing schedule.
Assign testers to schedule.
Oversee testing.

...

Task Frequency:

Attend Test Conference – Quarterly

Assign testers – daily

...

Confirm?

Automation Evaluation User Interface 128

Course Recommendations

We recommend that you upskill in the following technologies:

1. SAP Security -- Design and build SAP authorizations...
2. Mobile Architecture -- ...
3. Natural Language Processing -- ...
4. Hadoop Administration -- ...
5. Business Intelligence Strategy -- ...

Course Schedule:

Based on your recommendations, you have been automatically enrolled in the following course schedule, your course materials have been automatically ordered...

-Monday 6PM -- 9PM -- SAP Security

-Thursday 7PM -- 10PM -- Natural L...

Note: Mobile architecture course unavailable, alert set for new course being established

FIG. 1E

DATA PROCESSING FOR ROLE ASSESSMENT AND COURSE RECOMMENDATION

BACKGROUND

A role, such as a software developer role, may be associated with tasks, such as a code review task, that are to be completed as a part of the role. Similarly, each task may be associated with one or more activities. For example, the code review task may include a requirements review activity, a code editing activity, a report completion activity, and/or the like. Increasingly, tasks and activities are being completed using automated systems rather than manually by employees. For example, a scheduling activity may be completed by an automated scheduling system. Similarly, a report completion activity may be completed by an automated report generating system. As a result, entire roles may be switched from being performed manually by a person to being completed automatically by a system. Some tasks may be relatively easy to automate, such as tasks that include repetitive activities and do not require interaction with other people. Other tasks, however, may be difficult to automate, such as tasks that include non-repetitive activities, tasks that include activities that require creativity, tasks that include client facing activities, and/or the like.

SUMMARY

According to some implementations, a device may include one or more memories, and one or more processors, communicatively coupled to the one or more memories, to receive a command to identify an automation evaluation for a role, determine one or more tasks of the role based on data relating to the role, and determine one or more activities for the one or more tasks of the role based on the data relating to the role. The one or more processors may determine one or more automation scores for the one or more activities, which correspond to a suitability for automation of the one or more activities, based on a set of characteristics of the one or more activities and based on the data relating to the role, wherein the one or more automation scores are determined using a machine learning model to parse natural language descriptions of the one or more activities and score parsed portions of the natural language descriptions of the one or more activities. The one or more processors may generate, for the role, an aggregate automation score based on the one or more automation scores for the one or more activities, determine the automation evaluation for the role based on the aggregate automation score and one or more characteristics of an entity associated with the role, and perform an action relating to the automation evaluation as a response to the command to identify the automation evaluation and based on determining the automation evaluation.

According to some implementations, a method may include obtaining, by a device, a description of a set of activities, and parsing, by the device, the description using a machine learning natural language processing model to assign a set of automation scores to a set of portions of the description, an automation score, of the set of automation scores, for a portion, of the set of portions, representing an automation potential predicted for a task based on the portion. The method may include determining, by the device, an aggregate automation score for a role based on the set of automation scores. wherein the role is defined by a set of tasks, and wherein each task includes at least one activity of the set of activities. The method may include determining, by the device, an automation evaluation for the role based on the aggregate automation score and one or more characteristics of an entity associated with the role, determining, by the device, using a skills model, and based on the automation evaluation, a set of skills for the entity, and providing, by the device, a course associated with training for a skill of the set of skills.

According to some implementations, a non-transitory computer-readable medium may store instructions that include one or more instructions that, when executed by one or more processors of a device, cause the one or more processors to determine one or more automation scores for one or more activities based on a set of characteristics of the one or more activities and based on data relating to a role associated with the one or more activities, wherein the one or more automation scores are determined using a machine learning model to parse natural language descriptions of the one or more activities and score parsed portions of the natural language descriptions of the one or more activities. The one or more instructions may cause the one or more processors to generate, for the role, an aggregate automation score based on the one or more automation scores for the one or more activities, and determine an automation evaluation for the role based on the aggregate automation score and one or more characteristics of an entity associated with the role. The one or more instructions may cause the one or more processors to determine one or more skills relating to the entity based on the automation evaluation and using a skills model, and provide information associated with the automation evaluation and the one or more skills via a user interface.

BRIEF DESCRIPTION OF THE DRAWINGS

FIGS. 1A-1E are diagrams of an example implementation described herein.

DETAILED DESCRIPTION

Figure 1A:
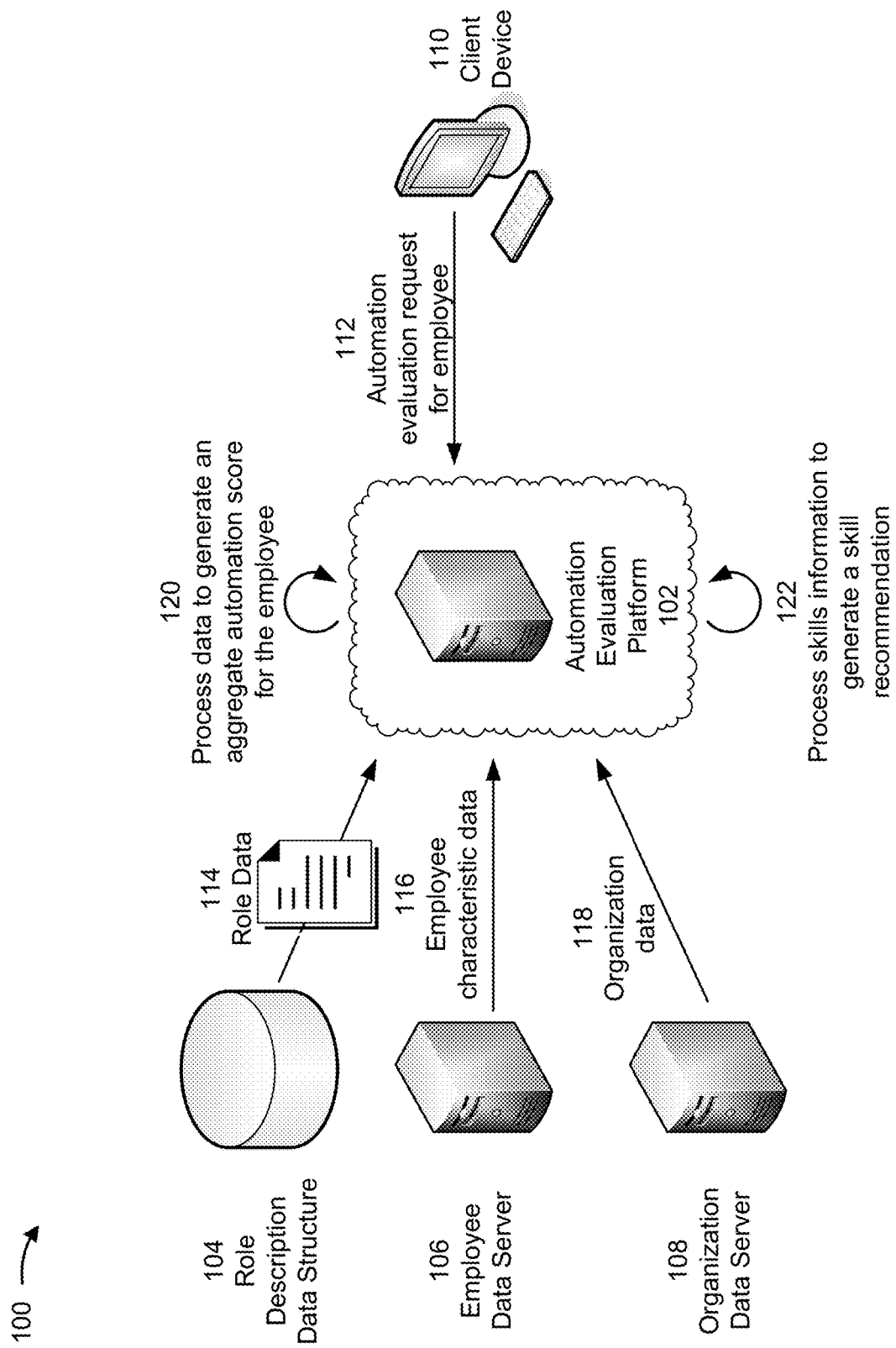

The following detailed description of example implementations refers to the accompanying drawings. The same reference numbers in different drawings may identify the same or similar elements.

Artificial intelligence and other techniques have resulted in increased automation of tasks and activities associated with tasks. For example, scheduling may be performed by an automated scheduling system. An organization may identify a role, such as a software tester, for automation based on determining that an automation system is established for tasks and activities associated with the role. For example, based on developing an automated software testing application, an organization may automate software testing tasks using the automated software testing application, and may reassign software testers to other roles at the organization.

To ensure an efficient allocation of resources, an organization may assign roles for automation based on determining that the roles (and tasks and activities thereof) are efficiently automatable, and may assign other roles for manual completion by employees based on determining that the other roles (and tasks and activities thereof) are not efficiently automatable. As a result, some employees may be reassigned from performing first tasks and activities in a first role, to performing new, second tasks and activities in a new, second role. However, to complete new tasks of new roles, employees may need to undergo training for the new tasks and the new roles. Such training may take excessive periods of time, resulting in the new tasks not being completed within a required period of time, which may negatively affect functioning of a system. For example, when a task includes resolution of an error in program code, delay in assigning a developer to resolve the error so that the developer can be trained may result in excessive utilization of processing resources, network resources, and/or the like as a result of the error persisting.

Moreover, as new automation technologies are being increasingly developed, many employees may be assigned to new roles at a single time, which may result in an excessive utilization of resources to train the employees, such as excessive network resources to provide a training program. Furthermore, providing training courses may be resource intensive for an organization, as a result of network resources being allocated for distributing computer-based training courses, processing resources being allocated for using computer-based training courses, facilities resources (e.g., rooms, energy, heating, etc.) being allocated for in-person training courses, and/or the like.

Moreover, reactive, manual reassignment and retraining of employees to address automation may lead to excessive use of computing resources. For example, manual assignment of work schedules for employees, manual distribution of course materials, manual assignment of training courses, and/or the like may utilize more computing resources than automated assignment of work schedules, automated distribution of course materials, automated assignment of training courses, and/or the like. In other cases, performing assessments of the automation potential of a particular employee and/or a particular role (with or without human intervention) may be difficult due to a large volume of data relating to multiple aspects of automation potential. This may result in high computer processing and/or storage costs.

Some implementations, described herein, provide an automated role assessment and course recommendation. For example, an automation evaluation platform may automatically determine an employee-specific evaluation of whether an employee's role and/or tasks and activities thereof will be automated, and may automatically identify and provide courses to facilitate proactive retraining, skills development, and/or the like. In this way, the automation evaluation platform may reduce a likelihood that an employee becomes inessential by ensuring that the employee has granular control over skills training.

Moreover, based on automatically and proactively assessing whether automation is likely for the employee's role, the automation evaluation platform may enable dynamic distribution of training courses, preemptive allocation of resources for training courses, and/or the like, thereby reducing a likelihood of excessive utilization of network resources relative to distributing training courses to hundreds, thousands, or millions of employees across multiple organizations after a role is automated.

Furthermore, based on performing an employee-specific automation evaluation for each employee, the automation evaluation platform may determine a likelihood of automation more accurately than a role-specific evaluation for many employees, thereby reducing a likelihood that an employee is provided unnecessary training courses and thereby reducing a utilization of network resources, computing resources, and/or the like associated with distributing training courses, scheduling training courses, and/or the like. Furthermore, based on performing an employee-specific automation evaluation, the automation evaluation platform may enable employee-specific course recommendations and automation evaluation-based prioritization in course availability, thereby enabling an organization to right-size resources dedicated to providing training courses, which may result in a reduction in overall utilization of processing resources, network resources, and/or the like to provide training courses.

Furthermore, implementations described herein use a rigorous, computerized process to perform automation evaluations and/or to perform course recommendations that were not previously performed or were previously performed using subjective human intuition or input. For example, currently there does not exist a technique to accurately predict whether a particular person is likely to have a role automated within a threshold period of time. Finally, automating the process for performing automation evaluation and course recommendation conserves computing resources (e.g., processor resources, memory resources, and/or the like) that would otherwise be wasted in attempting to manually and inefficiently complete tasks that may be automatable, by ensuring that employees are proactively transitioned from automatable roles to non-automatable roles (e.g., by proactively retraining an employee before a role is automatable to ensure that the employee does not remain in the role, once the role is automatable, while being retrained).

Figure 1B:
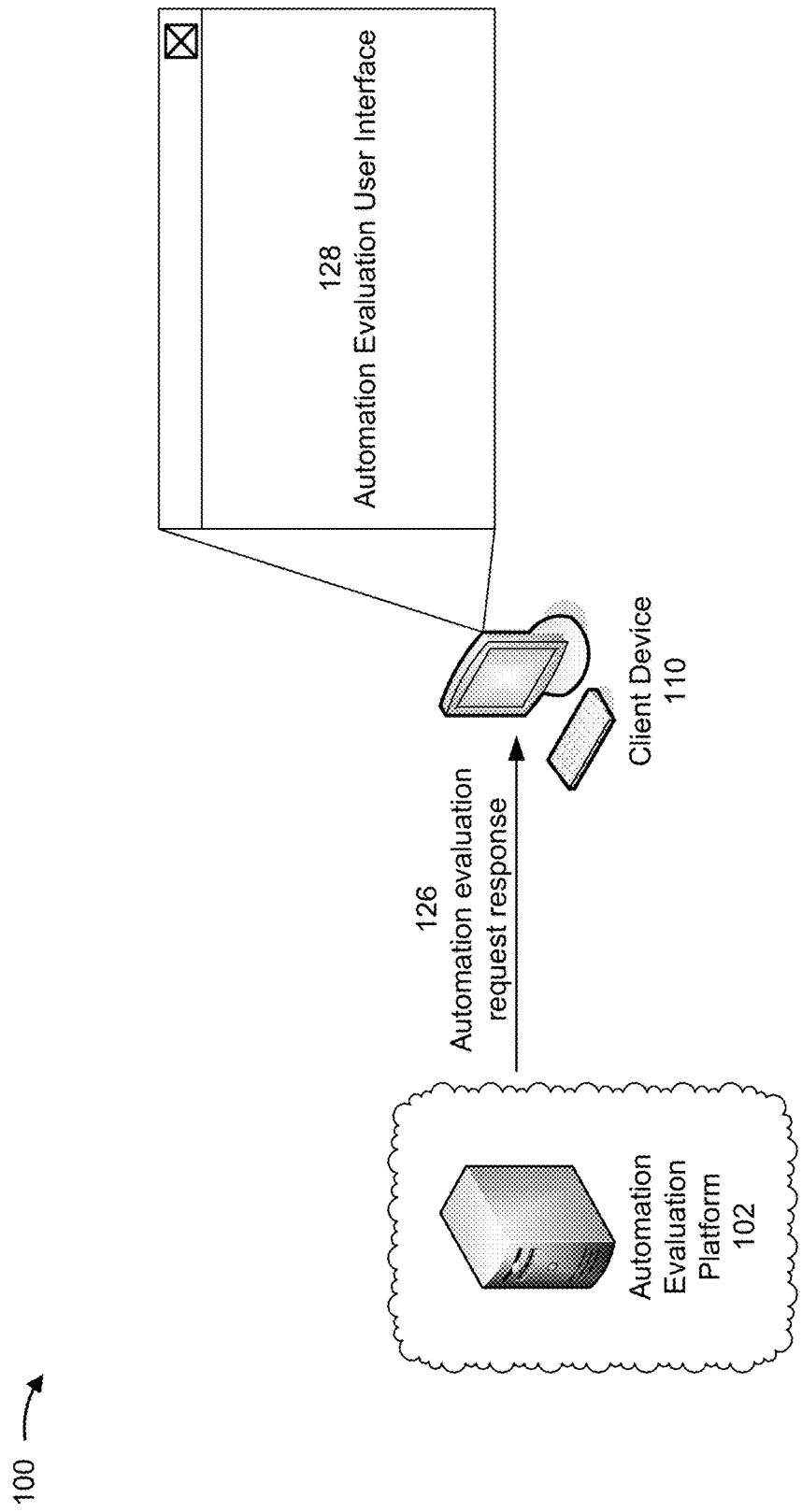
Figure 1D:
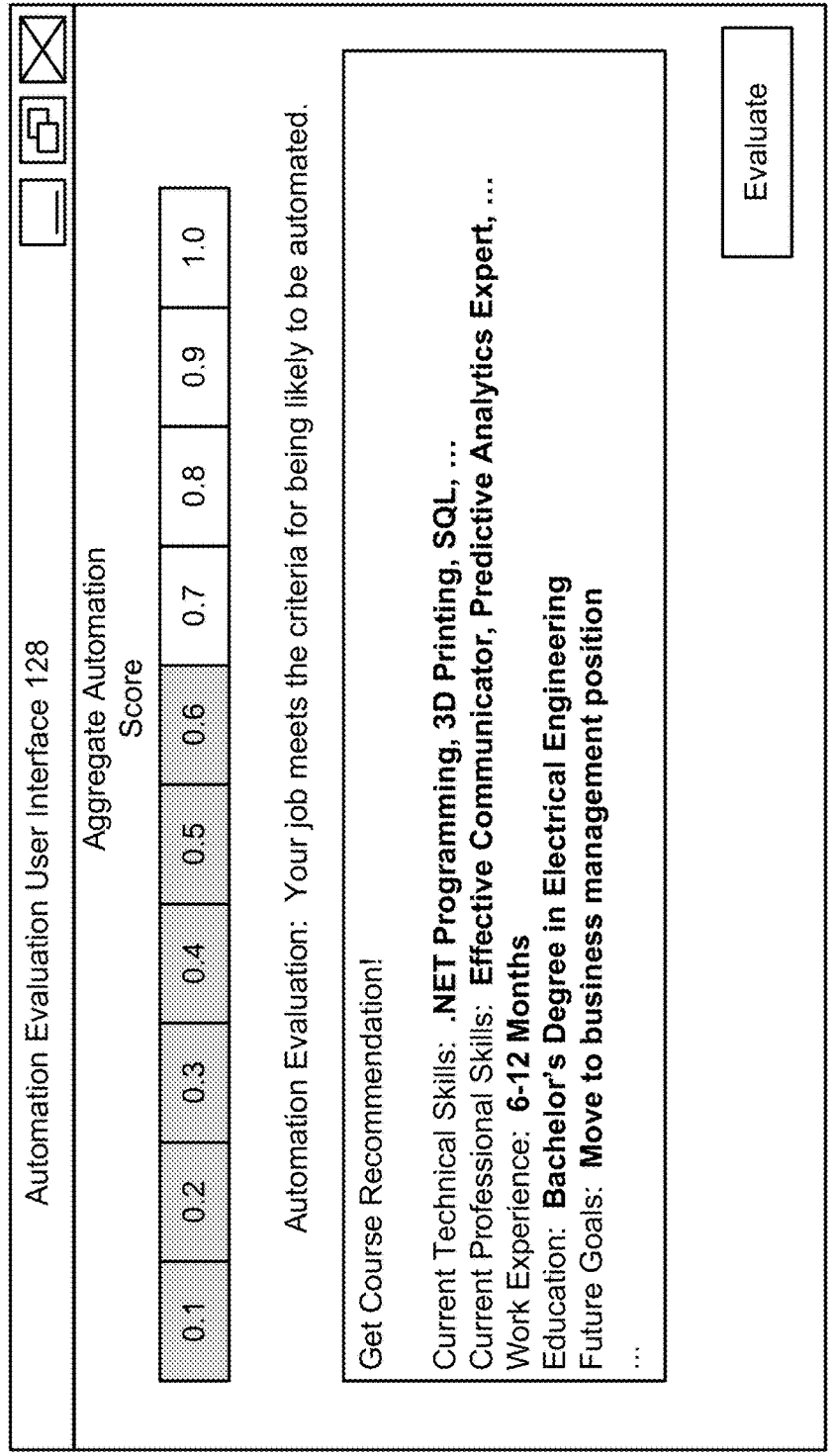

FIGS. 1A-1B are diagrams of an example implementation 100 described herein, and FIGS. 1C-1E are diagrams of example user interface views relating to example implementation 100. As shown in FIG. 1A, example implementation 100 includes an automation evaluation platform 102, which may be hosted in a cloud computing environment, a role description data structure 104, an employee data server 106, an organization data server 108, and a client device 110.

As further shown in FIG. 1A, and by reference number 112, automation evaluation platform 102 may receive an automation evaluation request for an employee from client device 110. For example, client device 110 may provide a user interface to receive a user interaction associated with indicating a request for the automation evaluation, and may transmit the automation evaluation request to automation evaluation platform 102 to cause the automation evaluation to be performed. In some implementations, client device 110 may transmit an automation evaluation request without user interaction. For example, client device 110 may transmit an automation evaluation request based on detecting a triggering event, such as determining that a new employee has been hired, determining that a new role has been assigned to an employee, determining that a new automation (e.g., an automated scheduler, an automated code tester, etc.) is available for implementation, and/or the like. Additionally, or alternatively, automation evaluation platform 102 may automatically determine to perform the automation evaluation without receiving a request from client device 110 based on detecting a triggering event.

As further shown in FIG. 1A, automation evaluation platform 102 may obtain data to perform the automation evaluation based on receiving the automation evaluation request. For example, automation evaluation platform 102 may obtain role data 114, which may identify a set of roles for the employee, a set of tasks associated with the set of roles, a set of activities associated with the set of tasks, and/or the like. In some implementations, automation evaluation platform 102 may obtain a natural language description of roles, tasks, and/or activities when obtaining role data 114. For example, automation evaluation platform 102 may obtain an employee handbook, a textual description provided by the employee, a requirements document pertaining to a task, a job description, and/or the like, and may use a natural language processing technique to determine roles, tasks, and/or activities identified by the natural language description.

Additionally, or alternatively, automation evaluation platform 102 may obtain employee characteristic data 116, which may identify one or more skills of an employee, a level of experience of an employee, a set of employee evaluations performed by a manager of the employee, a set of employee preferences, and/or the like. In some implementations, automation evaluation platform 102 may obtain employee characteristic data 116 identifying characteristics of one or more other employees. For example, automation evaluation platform 102 may identify one or more similar employees to the employee based on a common skill, a common level of experience, a common work location, a common role, a common task, a common activity, a common salary, and/or the like. In this case, automation evaluation platform 102 may obtain data relating to the one or more similar employees for use in determining course recommendations for the employee, for use in predicting a likelihood of automation of a role of the employee, and/or the like. For example, based on identifying a first employee at a first location who was assigned to a particular role, which was automated at the first location, automation evaluation platform 102 may predict, for a second employee at a second location who is assigned to the particular role, that the particular role is likely (e.g., associated with a threshold likelihood) to be automated at the second location within a threshold period of time.

Additionally, or alternatively, automation evaluation platform 102 may obtain organization data 118 associated with an employer of the employee. For example, automation evaluation platform 102 may obtain data identifying an industry of the organization; roles, tasks, and/or activities of the organization; automation capabilities of the organization; and/or the like. In some implementations, automation evaluation platform 102 may obtain organization data 118 associated with one or more other organizations. For example, automation evaluation platform 102 may identify one or more similar organizations to the organization, such as based on a common industry, a common set of roles, a common location, and/or the like, and may obtain data regarding the one or more similar organizations. In this case, automation evaluation platform 102 may use the data regarding the one or more similar organizations in predicting a likelihood of automation of a particular role. For example, based on identifying a first organization for which a particular role was automated, automation evaluation platform 102 may predict that a second organization is likely to automate the role within a threshold period of time based on the first organization and the second organization being in a common industry, having employed a common set of employees, and/or the like.

As further shown in FIG. 1A, and by reference number 120, automation evaluation platform 102 may process data to generate an aggregate automation score for an employee. For example, automation evaluation platform 102 may process the data (e.g., the role data, the employee characteristic data, and/or the organization data) to identify activities, to classify activities as automatable or not automatable (or a degree of being automatable, as described herein), to generate automation scores for tasks based on whether activities are automatable or not automatable, to aggregate the automation scores to determine an aggregated automation score and an automation evaluation, to identify skills, to determine a recommendation relating to skills and/or courses for training for skills, and/or the like, as described herein.

In some implementations, automation evaluation platform 102 may parse natural language descriptions of roles, tasks, and/or activities to identify the roles, tasks, and/or activities. For example, automation evaluation platform 102 may obtain data identifying, in natural language, a description of a role, and may parse the data to identify activities of the role, characteristics of the activities of the role, and/or the like.

In some implementations, automation evaluation platform 102 may determine a characteristic of an activity based on natural language processing of a task statement, which includes a description of the activity. For example, based on a description of a requirements gathering activity of a software design task being "talk with a client to discuss needs and wants for a custom software development project", automation evaluation platform 102 may use natural language processing to determine characteristics. In this case, characteristics may include client-facing ("talk with a client"), non-repetitive ("custom"), and/or the like. Similarly, based on a description of a data entry activity as "review documents and enter each data entry from a document into a field in a form, there will be 10 entries on each document and there will be 500 documents for entry", automation evaluation platform 102 may use natural language processing to determine characteristics, such as non-client facing ("review documents"), repetitive ("10 entries" and "500 documents for entry"), and/or the like. In this case, automation evaluation platform 102 may determine that a natural language text corresponds to a characteristic based on data relating to other task statements, data identifying characteristics of tasks and/or activities, employee input, and/or the like. In this way, automation evaluation platform 102 may identify characteristics of new activities for use in classifying the activities as automatable or not automatable, as described herein. Based on applying a rigorous and automated process to classify activities, automation evaluation platform 102 enables identification of characteristics of thousands or millions of activities for thousands or millions of employees, thereby increasing an accuracy and consistency of characteristic determination relative to requiring computing resources to be allocated for hundreds or thousands of technicians to manually classify activities for automation evaluations of the thousands or millions of employees.

In some implementations, automation evaluation platform 102 may determine whether an activity, identified for a role, is automatable and/or a level to which an activity is automatable. For example, using the role data, automation evaluation platform 102 may determine a suitability for automation of an activity based on a characteristic of the activity. In this case, automation evaluation platform 102 may generate a model of activity automatability. For example, automation evaluation platform 102 may train a model using information identifying a plurality of activities, characteristics of the plurality of activities, whether any or all of the plurality of activities have been automated, and/or the like, to identify characteristics that result in activities being automated and/ or a likelihood that an activity will be automated based on a set of multiple characteristics of the activity. As an example, automation evaluation platform 102 may determine that past activities, that were client facing, non-repetitive, non-hazardous, and/or the like, are associated with a threshold likelihood of being automated. In this case, automation evaluation platform 102 may determine that a relatively low score (e.g., as being unsuited for automation) is to be assigned to identified activities that are determined to be similar to the past activities (e.g., share one or more characteristics). In contrast, automation evaluation platform 102 may determine to assign a relatively high score (e.g., as being suited for automation) to an identified activity that is non-client facing, repetitive, hazardous, and/or the like.

In some implementations, automation evaluation platform 102 may perform a data preprocessing operation when generating the model of activity automatability. For example, automation evaluation platform 102 may preprocess data (e.g., the role data, the employee characteristic data, the organization data, and/or the like) to remove non-ASCII characters, white spaces, confidential data (e.g., health privacy data in an employee insurance record, payment data in an employee payroll record, etc.), and/or the like. In this way, automation evaluation platform 102 may organize thousands, millions, or billions of data entries for machine learning and model generation—a data set that cannot be processed objectively by a human actor.

In some implementations, automation evaluation platform 102 may perform a training operation when generating the model of activity automatability. For example, automation evaluation platform 102 may portion the data into a training set, a validation set, a test set, and/or the like. In some implementations, automation evaluation platform 102 may train the model of activity automatability using, for example, an unsupervised training procedure and based on the training set of the data. For example, automation evaluation platform 102 may perform dimensionality reduction to reduce the data to a minimum feature set, thereby reducing processing to train the model of activity automatability, and may apply a classification technique, to the minimum feature set.

In some implementations, automation evaluation platform 102 may use a logistic regression classification technique to determine a categorical outcome (e.g., that an activity is automatable, is not automatable, etc.). Additionally, or alternatively, automation evaluation platform 102 may use a naïve Bayesian classifier technique. In this case, automation evaluation platform 102 may perform binary recursive partitioning to split the data of the minimum feature set into partitions and/or branches, and use the partitions and/or branches to perform predictions (e.g., that an activity is automatable or is not automatable). Based on using recursive partitioning, automation evaluation platform 102 may reduce utilization of computing resources relative to manual, linear sorting and analysis of data points, thereby enabling use of thousands, millions, or billions of data points to train a model, which may result in a more accurate model than using fewer data points.

Additionally, or alternatively, automation evaluation platform 102 may use a support vector machine (SVM) classifier technique to generate a non-linear boundary between data points in the training set. In this case, the non-linear boundary is used to classify test data (e.g., data relating to an identified activity of an employee) into a particular class (e.g., a class indicating that the activity is automatable, a class indicating that the activity is not automatable, a class for an automation score of a first value, a class of an automation score of a second value, etc.).

Additionally, or alternatively, automation evaluation platform 102 may train the model of activity automatability using a supervised training procedure that includes receiving input to the model from a subject matter expert, which may reduce an amount of time, an amount of processing resources, and/or the like to train the model of activity automatability relative to an unsupervised training procedure. In some implementations, automation evaluation platform 102 may use one or more other model training techniques, such as a neural network technique, a latent semantic indexing technique, and/or the like. For example, automation evaluation platform 102 may perform an artificial neural network processing technique (e.g., using a two-layer feedforward neural network architecture, a three-layer feedforward neural network architecture, and/or the like) to perform pattern recognition with regard to patterns of whether activities described using different semantic descriptions are automatable or not, whether tasks including the activities will be automated or not, and/or the like. In this case, using the artificial neural network processing technique may improve an accuracy of a model generated by automation evaluation platform 102 by being more robust to noisy, imprecise, or incomplete data, and by enabling automation evaluation platform 102 to detect patterns and/or trends undetectable to human analysts or systems using less complex techniques.

As an example, automation evaluation platform 102 may use a supervised multi-label classification technique to train the model. For example, as a first step, automation evaluation platform 102 may map task statements regarding tasks to a set of previously classified activities using natural language processing. In this case, activities may be characterized as automatable or not-automatable based on characteristics of the activities and an analysis of the activities (e.g., by a technician, thereby reducing processing relative to automation evaluation platform 102 being required to analyze each activity). As a second step, automation evaluation platform 102 may determine classifier chains, whereby labels of target variables may be correlated (e.g., in this example, labels may be activities and correlation may refer to presence in a common task, a common role, and/or the like). In this case, automation evaluation platform 102 may use an output of a first label as an input for a second label (as well as one or more input features, which may be other data relating to the activities), and may determine a likelihood that a particular task that includes a set of activities (some of which are automatable and some of which are not automatable) will be automated based on a similarity to other tasks that include similar sets of activities. In this way, automation evaluation platform 102 transforms classification from a multilabel-classification problem to multiple single-classification problems, thereby reducing processing utilization. As a third step, automation evaluation platform 102 may determine a Hamming Loss Metric relating to an accuracy of a label in performing a classification by using the validation set of the data (e.g., an accuracy with which a weighting applied to each activity and whether each activity is automatable or not, results in a correct prediction of whether a task including each activity is automatable, thereby accounting for differing amounts to which automatability of any one activity influences automatability of a task and/or a role that includes the task). As a fourth step, automation evaluation platform 102 finalizes the model based on labels that satisfy a threshold accuracy associated with the Hamming Loss Metric, and may use the model for subsequent prediction of whether activities of a task and/or role are to result in the task and/or role being automated.

As another example, automation evaluation platform 102 may determine, using a linear regression technique, that a threshold percentage of activities, in a set of activities, that require interaction with a client are not currently automated, and may determine that activities that require interaction with a client are to be assigned relatively low automation scores. In contrast, automation evaluation platform 102 may determine that another threshold percentage of activities that are repetitive (e.g., that are repeated a threshold quantity of times within a threshold period of time, such as hundreds, thousands, or millions of times each day, week, or month) are automated, and may determine to assign a relatively high automation score to another activity that is repetitive. Based on the characteristics of activities that result in the activities being automated or not being automated, automation evaluation platform 102 may generate the model of activity automatability, and may use the model of activity automatability for analyzing new activities, new tasks, new roles, and/or the like that automation evaluation platform 102 identifies.

In some implementations, automation evaluation platform 102 may determine an automation score for each activity of a task. For example, automation evaluation platform 102 may determine that, for a software developer role, a bug resolution task includes a ticket intake activity, a ticket resolution activity, and a resolution documentation activity. In this case, automation evaluation platform 102 may determine a first automation score for the ticket intake activity (e.g., a lower automation score based on requiring interaction with a software user and using the model of activity automatability), a second automation score for the ticket resolution activity (e.g., based on resolving tickets having a relatively high creativity characteristic and based on the task being non-repetitive and using the model of activity automatability), and a third automation score for the resolution documentation activity (e.g., a relatively high automation score based on an automatic code documentation tool being in use at other organizations and based on the task being repetitive and using the model of activity automatability).

In some implementations, automation evaluation platform 102 may assign each automation score to each task based on an equation, such as:

$$DA_1 = \frac{\text{Count}_{Automatable}}{\text{Count}_{Total}}$$

where $DA_1$ (degree of automation) represents an automation score for a task of index value 1, $\text{Count}_{Automatable}$ represents a quantity of activities of the task classified as automatable activities (e.g., using the model of activity automatability, based on an expert classification, and/or the like), and $\text{Count}_{Total}$ represents a total quantity of activities of the task. In this case, automation evaluation platform 102 may use classifications regarding thousands of activities to determine automation scores for each task. In some implementations, automation evaluation platform 102 may use a multi-label classification technique to map activities to tasks for determining automation scores. In some implementations, automation evaluation platform 102 may use a binary relevance classifier chain technique, which may be more efficient than other classifier techniques for large quantities of tasks and activities, such as thousands of tasks and activities.

In some implementations, automation evaluation platform 102 may aggregate multiple automation scores to generate the aggregate automation score. For example, automation evaluation platform 102 may determine a mean of the multiple automation scores, a median of the multiple automation scores, a minimum of the multiple automation scores, a maximum of the multiple automation scores, and/or the like to determine the aggregate automation score for a role.

In some implementations, automation evaluation platform 102 may apply a set of weights to each automation score when determining the aggregate automation score. For example, based on the model of activity automatability, automation evaluation platform 102 may apply a first weight to a first automation score based on a predictiveness of the first activity in determining whether a task or a role including the first activity will be automated, and a second automation score to a second activity based on a predictiveness of the second activity in determining whether a task or a role including the second activity will be automated. In this way, automation evaluation platform 102 accounts for activities with differing levels of influence on whether a task or a role is automated.

In some implementations, automation evaluation platform 102 may determine an automation evaluation for an employee based on the aggregate automation score. For example, automation evaluation platform 102 may determine whether a role to which the employee is assigned is likely to be automated within a threshold period of time based on the aggregate automation score. In this case, the automation evaluation may represent an evaluation of whether the role has a threshold likelihood of automation within a threshold period of time (e.g., based on whether the role satisfies a threshold aggregate automation score, based on one or more characteristics of an employee assigned to the role, etc.), whether a threshold cost is associated with automation (e.g., a cost less than a value from automating the role based on automation evaluation platform 102 performing a cost-benefit analysis of implementing an automation of tasks and/or activities of the role), and/or the like.

In some implementations, automation evaluation platform 102 may determine the automation evaluation based on one or more characteristics of the employee. For example, automation evaluation platform 102 may process data relating to automated roles, and may determine that first employees that repeat a client-facing activity with a threshold frequency are less likely to have roles become automated than second employees that perform the client facing-activity with less than the threshold frequency (e.g., based on the first employees being efficient at the activities and not needing automation to increase efficiency).

In this case, based on employee characteristic data indicating that a first employee repeats a client-facing activity with the threshold frequency, automation evaluation platform 102 may set a first, relatively high threshold for determining that a role is likely to be automated based on the aggregate automation score. In contrast, for a second employee that repeats the same client-facing activity with less than the threshold frequency, automation evaluation platform 102 may set a second, relatively low threshold for determining that the role is likely to be automated (e.g., based on the second employee being predicted to be less efficient and more in need of automation to improve efficiency than the first employee). In this way, by performing an employee-specific automation evaluation, rather than a role-specific automation evaluation, automation evaluation platform 102 improves an accuracy of the automation evaluation.

As further shown in FIG. 1A, and by reference number 122, automation evaluation platform 102 may process skills information to generate a course recommendation. For example, automation evaluation platform 102 may process employee characteristic data identifying skills of the employee, skills of other employees, skills associated with roles, tasks, and/or activities, and/or the like to generate a recommendation regarding skills for the employee.

In some implementations, automation evaluation platform 102 may generate a skills model, and may use the skills model to generate the course recommendation. For example, based on data relating to hundreds, thousands, and/or millions of employees across multiple organizations, automation evaluation platform 102 may determine complimentary skills (e.g., common sets of skills that are associated with a threshold likelihood of occurring together), skills associated with reducing an aggregate automation score (e.g., skills associated with qualifying an employee for a new role less likely to be automated, skills that improve an employee's performance at a current role to reduce a likelihood of automation, skills that enable an employee to complete activities classified as not automatable (or with a relatively low automation score), etc.), and/or the like. In this case, the skills model may be an item-based collaborative filtering model, a single value decomposition model, a hybrid recommendation model, and/or another type of model that enables recommendation of a training course for a first skill based on a characteristic, such as a second skill of the employee, a role of the employee, and/or the like, and may be generated as described above with regard to the model of activity automatability.

In some implementations, automation evaluation platform 102 may use a machine learning technique, a natural language processing technique, a heuristic technique, and/or the like to generate the skills model. For example, automation evaluation platform 102 may use collaborative filtering (e.g., user based collaborative filtering or item based collaborative filtering) to determine employee skill preferences based on current sets of skills of a set of employees, and may use the employee skill preferences to identify new skills for a particular employee that the particular employee is likely to desire to learn, thereby enabling the employee to gain skills that the employee desires to learn but may not have heard of, and thus may not have been able to identify as skills to learn without a recommendation from automation evaluation platform 102.

In some implementations, automation evaluation platform 102 may identify similar employees to the particular employee based on skill overlap, and may recommend skills of the similar employees to the particular employee. For example, automation evaluation platform 102 may process course evaluations of courses for a group of employees, determine that skills of a particular employee overlap with skills of the group of employees, and may select a course with a relatively high course evaluation for the particular employee, thereby increasing a likelihood that the course will relate to a skill desired by the particular employee relative to selecting the course without identifying skill overlap.

In some implementations, automation evaluation platform 102 may use a dimensionality reduction technique to reduce processing required to determine a course recommendation. For example, automation evaluation platform 102 may use singular value decomposition to reduce a matrix of employees (e.g., tens of thousands or millions of employees) and skills (e.g., thousands of skills) to a processable size (e.g., less than a threshold size). In this case, automation evaluation platform 102 may use the singular value decomposition technique to determine portions of the matrix that are associated with less than a threshold relevance to identifying an employee preference with regard to skills, and may remove the portions from the matrix to reduce processing utilization in analyzing the matrix to determine a course recommendation.

In some implementations, automation evaluation platform 102 may generate a recommendation of a course for an employee. For example, based on determining that the employee is associated with a first skill of a set of complementary skills, automation evaluation platform 102 may recommend a course relating to training for a second skill of the set of complementary skills. Additionally, or alternatively, based on employee characteristic data indicating a preferred career path of a management career path, automation evaluation platform 102 may recommend a management course to the employee. Additionally, or alternatively, based on a skill being determined to relate to activities that are classified as not automatable based on the model of activity automatability described above, such as an artificial intelligence programming skill, an internet of things programming skill, a blockchain skill, a cyber security skill, and/or the like, automation evaluation platform 102 may recommend a course to train for the skill to enable reassignment of the employee to another role and to reduce a likelihood of an employee being assigned to a role that will be automated.

As shown in FIG. 1B, and by reference number 126, based on automation evaluation platform 102 determining the automation evaluation and the course recommendation, automation evaluation platform 102 may provide a response to the automation evaluation request. For example, automation evaluation platform 102 may provide, for display via an automation evaluation user interface 128 of client device 110, information identifying results of the automation evaluation, as described below with regard to user interface views 130-134.

As shown in FIG. 1C, a first user interface view 130 of automation evaluation user interface 128 provided by automation evaluation platform 102 enables confirmation of data relating to performing an automation evaluation. For example, automation evaluation platform 102 may automatically obtain data relating to the employee (e.g., a role, such as "Test Architecture Specialist"), and may provide the information for display to the employee for confirmation and/or alteration. As an example, based on not having a description of the role "Test Architecture Specialist") stored in a data structure, automation evaluation platform 102 may provide a user interface element to receive a natural language description of the role.

In this case, the employee may enter the description (e.g., "Develop strategic plans . . . "), and automation evaluation platform 102 may automatically parse the natural language description of the role to identify tasks, activities, and/or the like associated with the role. In this way, based on permitting natural language description of a role, automation evaluation platform 102 reduces a utilization of computing resources relative to requiring an employee to navigate a set of fields, menus, and/or descriptions to describe the role using preselected options. Based on the role, the tasks, and/or the activities being identified, automation evaluation platform 102 may receive an indication of a frequency with which activities are performed by the employee and/or one or more other characteristics for the role, tasks, and activities. In some implementations, automation evaluation platform 102 may automatically analyze employee timesheets, employee computer usage, employee evaluations, and/or the like to automatically identify the frequency of performance of different tasks and/or activities without receiving employee input. Additionally, or alternatively, automation evaluation platform 102 may automatically review employee written code, employee evaluations, and/or the like to identify a skill of the employee at performing the role, tasks, and activities (e.g., which may be used in weighting automation scores, setting thresholds for the aggregate automation score, and/or the like).

As shown in FIG. 1D, and by user interface view 132, based on performing the automation evaluation, automation evaluation platform 102 may provide results of the automation evaluation for display via automation evaluation user interface 128. For example, automation evaluation platform 102 may identify the aggregate automation score (e.g., 0.6/1.0), may identify the automation evaluation (e.g., "Your job meets the criteria for being likely to be automated"), and may obtain additional information for generating the course recommendation. In this case, automation evaluation platform 102 may determine that the aggregate automation score satisfies a threshold for the role for the employee, which may result in automation evaluation platform 102 providing the evaluation that the role of the employee is likely to be automated. In this case, user interface view 132 provides information identifying current technical skills, professional skills, work experience, education, goals, and/or the like based on automatically parsing an employee resume, an employee questionnaire, an employee evaluation, an employee personnel file, and/or the like, and automation evaluation platform 102 may detect user interactions with user interface view 132 associated with identifying one or more parameters (e.g., a future goal), modifying one or more parameters (e.g., altering a work experience), and/or the like.

As shown in FIG. 1E, and by user interview view 134, based on determining the skills recommendation, automation evaluation platform 102 may provide course recommendations via automation evaluation user interface 128. For example, automation evaluation platform 102 may provide information to identify a set of skills that are recommended for an employee (e.g., an "SAP Security" skill, a "Mobile Architecture" skill, etc.). Additionally, or alternatively, automation evaluation platform 102 may provide information identifying a course schedule for one or more courses automatically selected for the employee corresponding to the set of skills. In some implementations, automation evaluation platform 102 may prioritize one or more employees for a course based on the automation evaluation. For example, automation evaluation platform 102 may determine to prioritize a first employee with a relatively high aggregate automation score over a second employee with a relatively low aggregate automation score.

In some implementations, automation evaluation platform 102 may automatically obtain a video-based course or an audio-based course, and may provide the course via automation evaluation user interface 128. For example, automation evaluation platform 102 may automatically search the web for a course associated with a recommended skill, and may automatically allocate resources for a content delivery network (CDN) to distribute the course to many employees (e.g., thereby reducing a utilization of network resources relative to many employees separately attempting to obtain the course). In this case, automation evaluation platform 102 may generate a user interface (e.g., another view of automation evaluation user interface 128) in which to provide the course to the many employees (e.g., thereby reducing a utilization of memory resources relative to each employee obtaining a separate audio or video playback application for the course).

In some implementations, automation evaluation platform 102 may schedule a meeting for an employee with a manager of the employee to discuss results of the automation evaluation and the course recommendation, and may transmit alerts and/or calendar events relating to the meeting to client devices used by the employee (e.g., client device 110), the manager, and/or the like. In some implementations, automation evaluation platform 102 may provide a chat functionality to discuss results of the automation evaluation with a manager, with other employees that have received similar evaluations (e.g., a similar aggregate automation score, a similar course recommendation, etc.), and/or the like. For example, automation evaluation platform 102 may update the automation evaluation user interface to include a chatroom user interface element, thereby obviating a need for a separate chat application.

In some implementations, automation evaluation platform 102 may automatically schedule a course relating to the course recommendation. For example, automation evaluation platform 102 may automatically reserve a room, transmit alerts to a set of employees identifying the room, set a temperature of the room, unlock a door of the room, and/or the like to schedule the course. Additionally, or alternatively, when a course is unavailable or full, automation evaluation platform 102 may automatically set an alert for the employee, thereby reducing a utilization of network resources relative to each employee being required to periodically and manually check for course availability (e.g., which may result in thousands, millions, or tens of millions of queries across multiple organizations).

In some implementations, automation evaluation platform 102 may aggregate multiple automation evaluations for a group of employees, and may perform one or more actions associated with the multiple automation evaluations. For example, automation evaluation platform 102 may identify a group of employees, each of whom indicated a common work goal and received an automation evaluation indicating roles likely to be automated, and may schedule a training course for the group of employees. Additionally, or alternatively, automation evaluation platform 102 may automatically schedule, and may transmit alerts for a meeting to discuss results of a group of automation evaluations performed for a group of employees associated with a common role.

In this way, automation evaluation platform 102 automatically performs an automation evaluation on an employee-specific basis. Based on performing the automation evaluation for each employee rather than for each role, automation evaluation platform 102 improves an accuracy of the automation evaluation, thereby reducing a likelihood that employees are trained, unnecessarily, for new roles and/or reducing a likelihood that employees are unprepared for role automation, which may result in thousands of employees needing to train for new roles concurrently. Furthermore, based on automatically obtaining data from organizational data structures, task descriptions, and/or the like, automation evaluation platform 102 may reduce a utilization of processing resources and/or network resources relative to each employee being required to manually, and inaccurately input information for an automation evaluation and to receive a course recommendation.

As indicated above, FIGS. 1A-1E are provided merely as an example. Other examples are possible and may differ from what was described with regard to FIGS. 1A-1E.

Figure 2A:
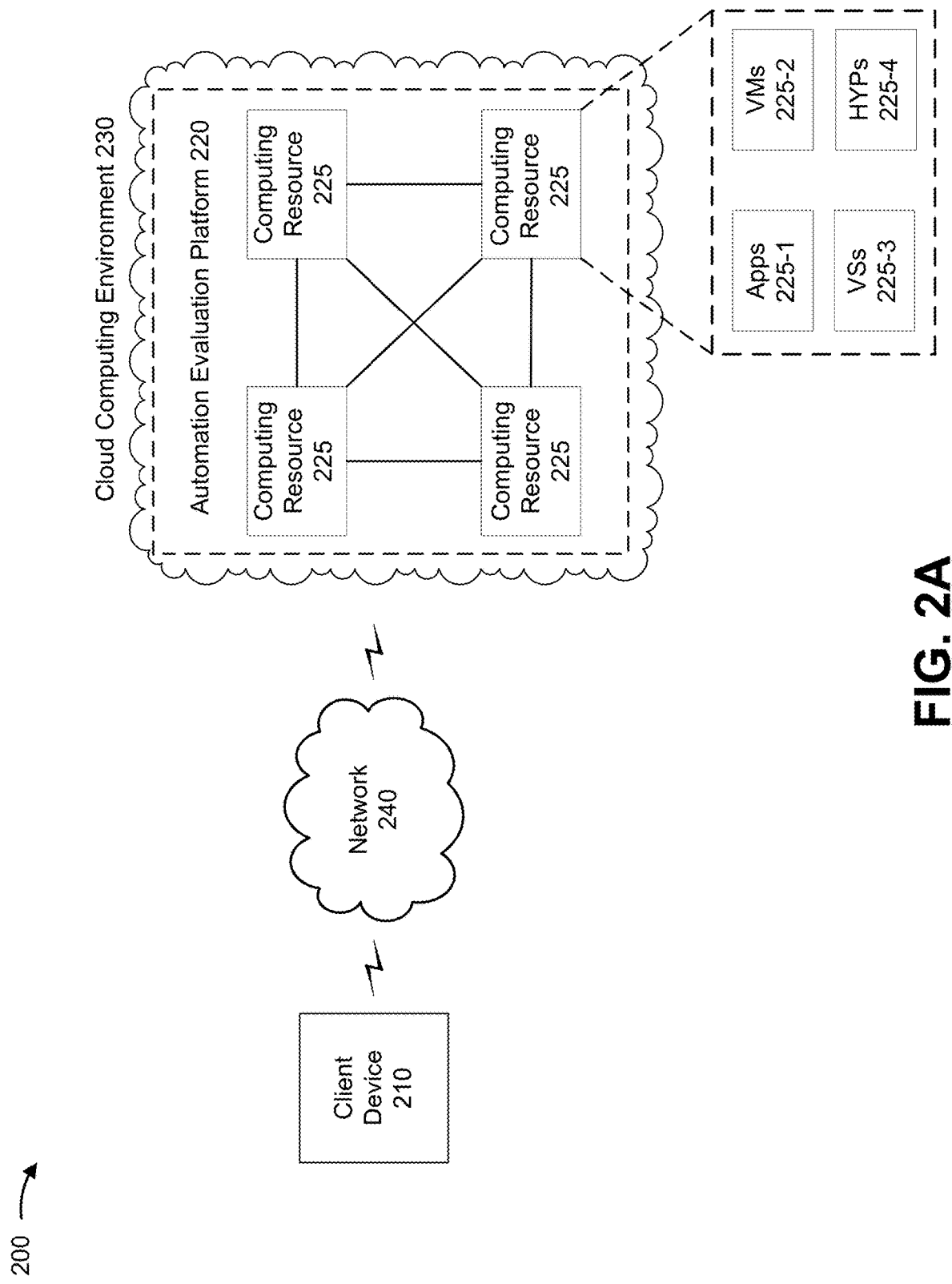
FIGS. 2A and 2B are diagrams of an example environment in which systems and/or methods, described herein, may be implemented.
Figure 2B:
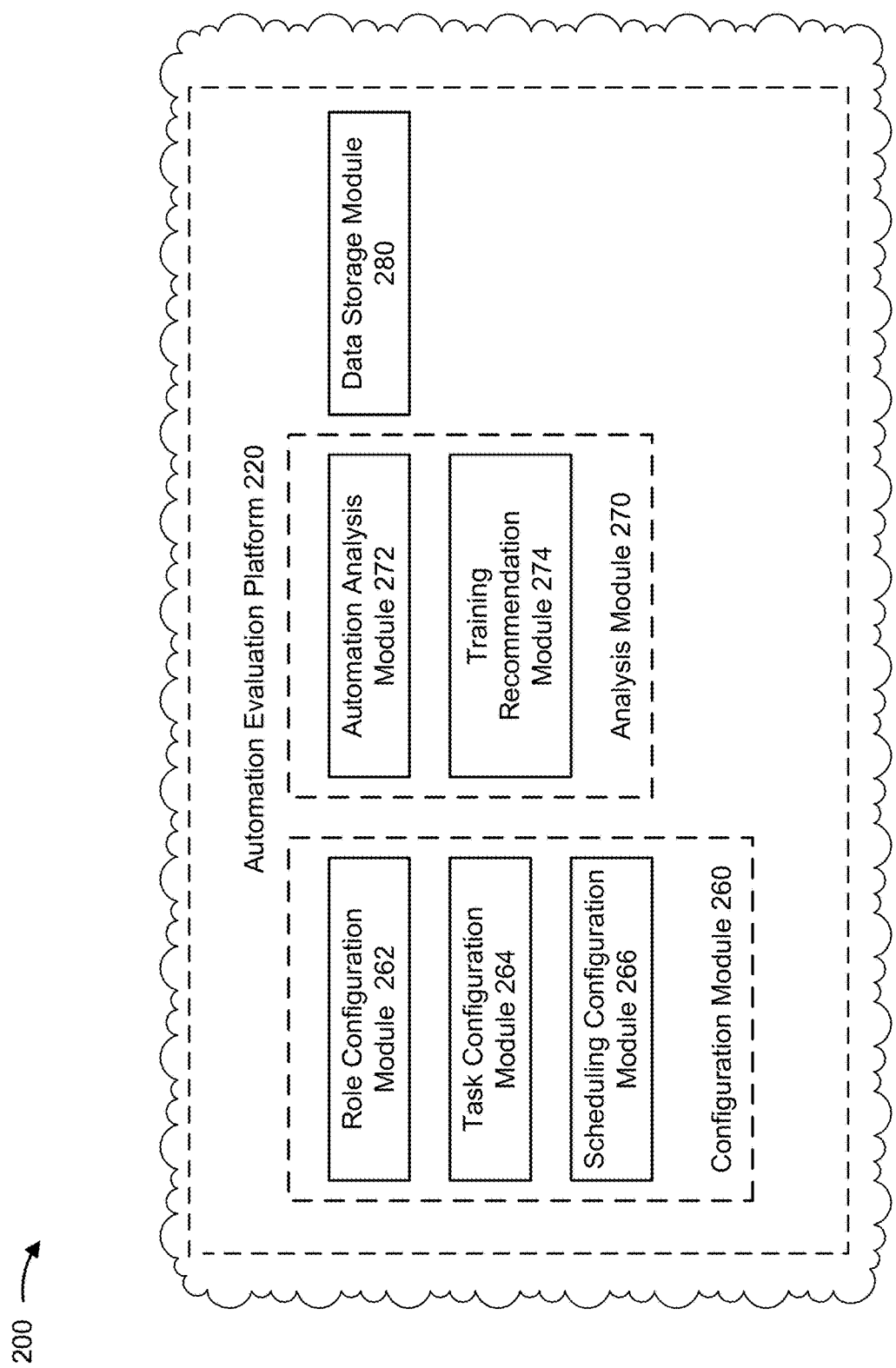

FIGS. 2A and 2B are diagrams of an example environment 200 in which systems and/or methods, described herein, may be implemented. As shown in FIG. 2A, environment 200 may include a client device 210, an automation evaluation platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with role assessment and course recommendation. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may transmit an automation evaluation request to automation evaluation platform 220 (e.g., based on receiving the request from an employee), may provide results of the automation evaluation request (e.g., via a user interface), and/or the like.

Automation evaluation platform 220 includes one or more computing resources assigned to perform an automation evaluation, provide a course recommendation, and automatically implement response actions relating to the automation evaluation and/or the course recommendation. For example, automation evaluation platform 220 may be a platform implemented by cloud computing environment 230 that may determine a likelihood of automation of a role for an employee, and may provide a course recommendation for the employee based on the likelihood of automation of the role. In some implementations, automation evaluation platform 220 is implemented by computing resources 225 of cloud computing environment 230.

Cloud computing environment 230 includes an environment that delivers computing as a service, whereby shared resources, services, etc. may be provided to client device 210, automation evaluation platform 220, and/or the like. Cloud computing environment 230 may provide computation, software, data access, storage, and/or other services that do not require end-user knowledge of a physical location and configuration of a system and/or a device that delivers the services. As shown, cloud computing environment 230 may include automation evaluation platform 220 and computing resource 225.

Computing resource 225 includes one or more personal computers, workstation computers, server devices, or another type of computation and/or communication device. In some implementations, computing resource 225 may host automation evaluation platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with automation evaluation platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, automation evaluation platform 220 may include multiple modules, such as a configuration module 260, which includes a role configuration module 262, a task configuration module 264, and a scheduling configuration module 266; an analysis module 270, which includes an automation analysis module 272 and a training recommendation module 274; and a data storage module 280.

Configuration module 260 is implemented using one or more computing resources 225 to enable configuration for automation evaluations. For example, configuration module 260 includes role configuration module 262 to identify roles of employees based on employee evaluation data, payroll records data, employee resume data, social media profile data, and/or the like. Similarly, configuration module 260 includes task configuration module 264 to identify tasks and/or activities associated with each role. For example, task configuration module 264 may include a natural language processing functionality to process a task description to identify activities in a task, characteristics of each activity, and/or the like. Similarly, configuration module 260 includes scheduling configuration module 266 to perform scheduling relating to skills recommendations. For example, scheduling configuration module 266 may determine course availability, automatically schedule an employee for a course, automatically schedule a new course, and/or the like. In some implementations, configuration module 260 may be implemented using a web application.

Analysis module 270 is implemented using one or more computing resources 225 to enable analysis to perform automation evaluations. For example, analysis module 270 includes automation analysis module 272 to determine a likelihood of a role being automated and/or a likelihood of tasks and/or activities thereof being automated within a threshold period of time. Similarly, analysis module 270 includes training recommendation module 274 to determine a recommendation for a course for an employee based on skills of the employee, goals of the employee, an automation evaluation for the employee, and/or the like. In some implementations, analysis module 270 may be implemented using a machine learning technique, a heuristic technique, a statistical technique (e.g., an R engine), and/or the like.

Data storage module 280 is implemented using one or more computing resources 225 to store data relating to performing an automation evaluation. For example, data storage module 280 may be a SQL database, a data lake, and/or the like to store thousands, millions, tens of millions, and/or the like of data entries for analyzing automation of roles and upskilling by employees.

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
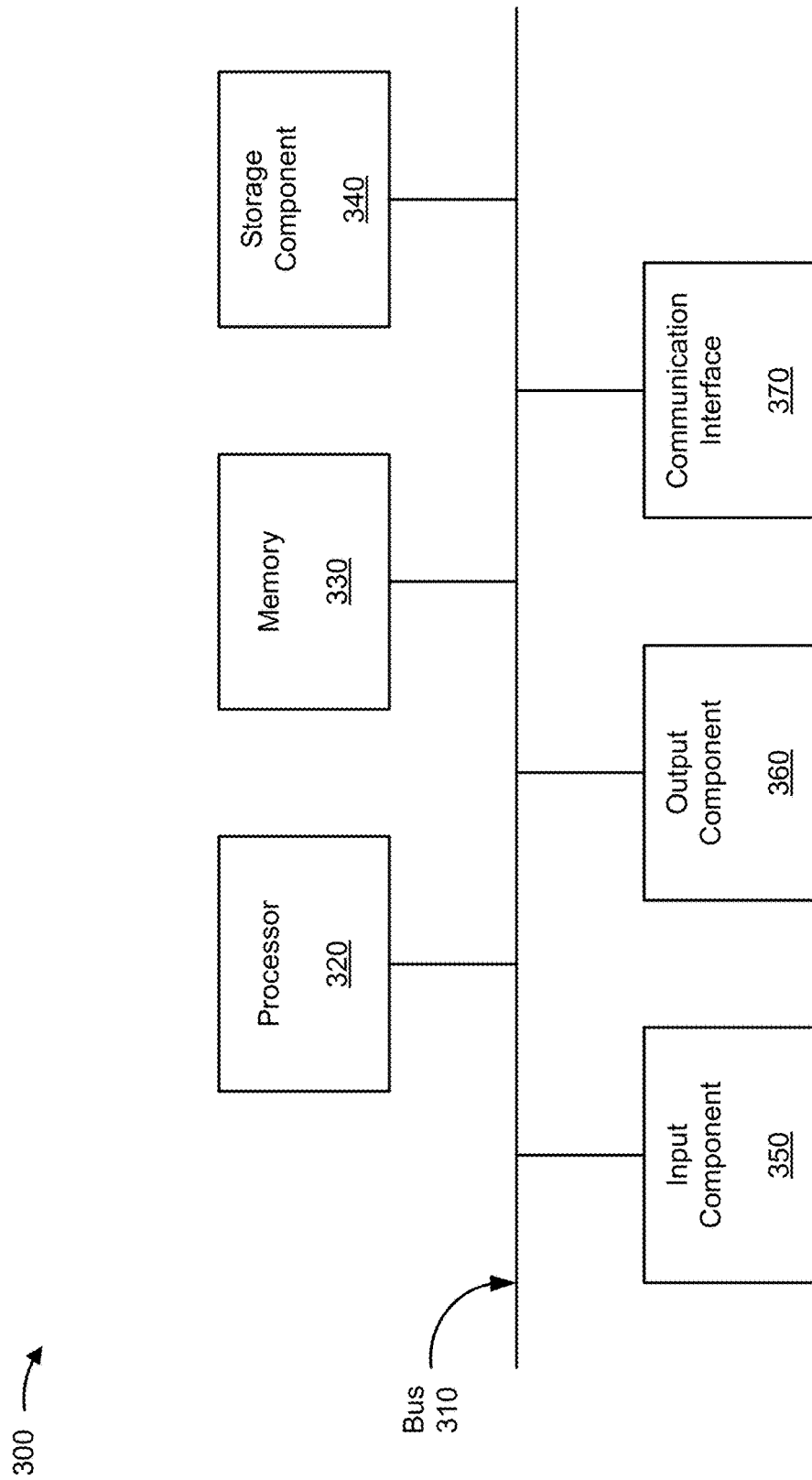
FIG. 3 is a diagram of example components of one or more devices of FIG. 2.

FIG. 3 is a diagram of example components of a device 300. Device 300 may correspond to client device 210, automation evaluation platform 220, and/or computing resource 225. In some implementations, client device 210, automation evaluation platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
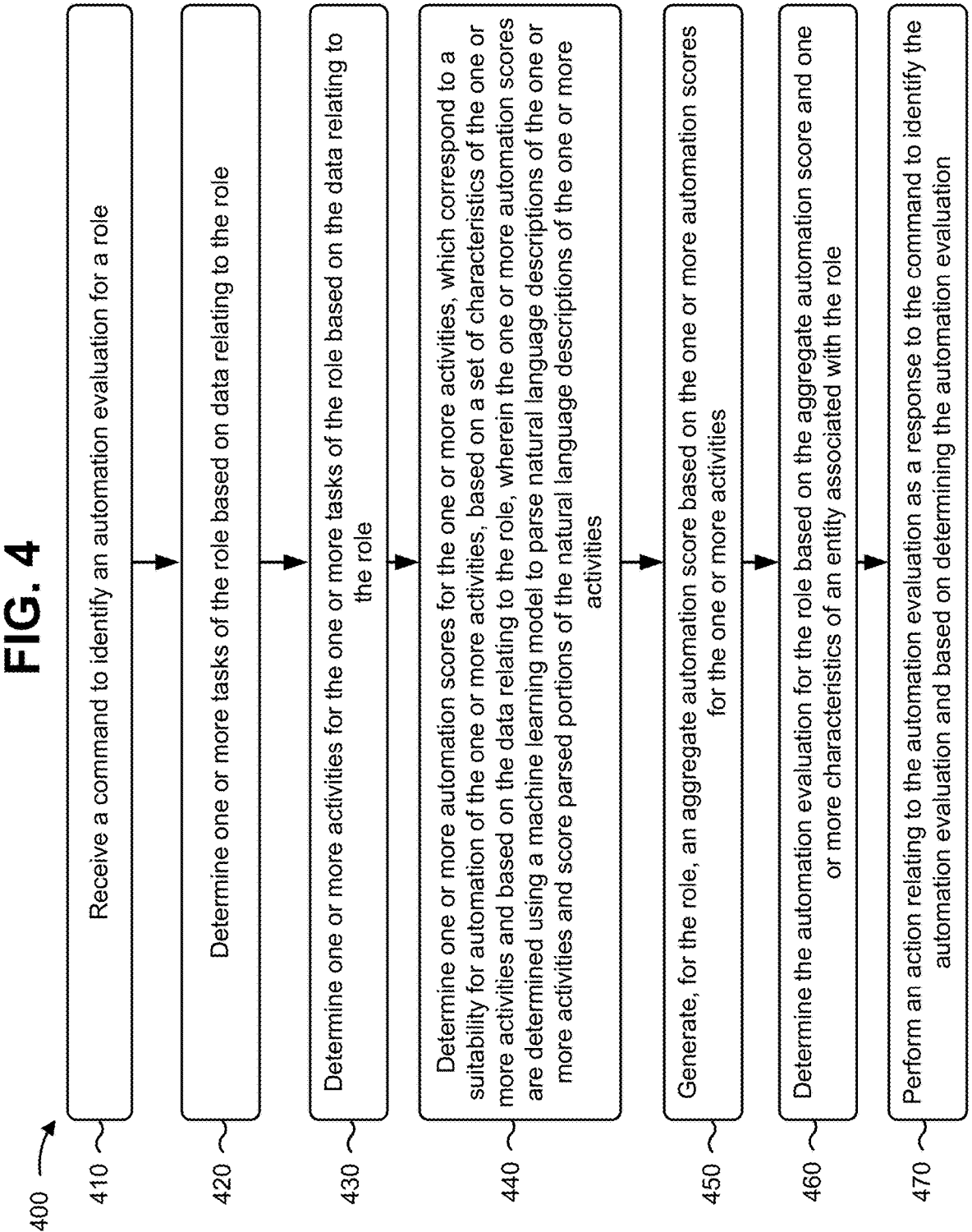
FIG. 4 is a flow chart of an example process for performing an automation evaluation.

FIG. 4 is a flow chart of an example process 400 for performing an automation evaluation. In some implementations, one or more process blocks of FIG. 4 may be performed by an automation evaluation platform (e.g. automation evaluation platform 220). In some implementations, one or more process blocks of FIG. 4 may be performed by another device or a group of devices separate from or including an automation evaluation platform (e.g. automation evaluation platform 220), such as a client device (e.g. client device 210) and/or a computing resource (e.g. computing resource 225).

As shown in FIG. 4, process 400 may include receiving a command to identify an automation evaluation for a role (block 410). For example, the automation evaluation platform (e.g., using computing resource 225, processor 320, memory 330, storage component 340, input component 350, communication interface 370, and/or the like) may receive a command to identify an automation evaluation for a role, as described above in connection with FIGS. 1A-1E.

As further shown in FIG. 4, process 400 may include determining one or more tasks of the role based on data relating to the role (block 420). For example, the automation evaluation platform (e.g., using computing resource 225, processor 320, memory 330, storage component 340, and/or the like) may determine one or more tasks of the role based on data relating to the role, as described above in connection with FIGS. 1A-1E.

As further shown in FIG. 4, process 400 may include determining one or more activities for the one or more tasks of the role based on the data relating to the role (block 430). For example, the automation evaluation platform (e.g., using computing resource 225, processor 320, memory 330, storage component 340, and/or the like) may determine one or more activities for the one or more tasks of the role based on the data relating to the role, as described above in connection with FIGS. 1A-1E.

As further shown in FIG. 4, process 400 may include determining one or more automation scores for the one or more activities, which correspond to a suitability for automation of the one or more activities, based on a set of characteristics of the one or more activities and based on the data relating to the role, wherein the one or more automation scores are determined using a machine learning model to parse natural language descriptions of the one or more activities and score parsed portions of the natural language descriptions of the one or more activities (block 440). For example, the automation evaluation platform (e.g., using computing resource 225, processor 320, memory 330, storage component 340, and/or the like) may determine one or more automation scores for the one or more activities, which correspond to a suitability for automation of the one or more activities, based on a set of characteristics of the one or more activities and based on the data relating to the role, as described above in connection with FIGS. 1A-1E. In some implementations, the one or more automation scores are determined using a machine learning model to parse natural language descriptions of the one or more activities and score parsed portions of the natural language descriptions of the one or more activities.

As further shown in FIG. 4, process 400 may include generating, for the role, an aggregate automation score based on the one or more automation scores for the one or more activities (block 450). For example, the automation evaluation platform (e.g., using computing resource 225, processor 320, memory 330, storage component 340, and/or the like) may generate, for the role, an aggregate automation score based on the one or more automation scores for the one or more activities, as described above in connection with FIGS. 1A-1E.

As further shown in FIG. 4, process 400 may include determining the automation evaluation for the role based on the aggregate automation score and one or more characteristics of an entity associated with the role (block 460). For example, the automation evaluation platform (e.g., using computing resource 225, processor 320, memory 330, storage component 340, and/or the like) may determine the automation evaluation for the role based on the aggregate automation score and one or more characteristics of an entity associated with the role, as described above in connection with FIGS. 1A-1E.

As further shown in FIG. 4, process 400 may include performing an action relating to the automation evaluation as a response to the command to identify the automation evaluation and based on determining the automation evaluation (block 470). For example, the automation evaluation platform (e.g., using computing resource 225, processor 320, memory 330, storage component 340, input component 350, output component 360, communication interface 370, and/or the like) may perform an action relating to the automation evaluation as a response to the command to identify the automation evaluation and based on determining the automation evaluation, as described above in connection with FIGS. 1A-1E.

Process 400 may include additional implementations, such as any single implementation or any combination of implementations described below and/or in connection with one or more other processes described elsewhere herein.

In some implementations, the automation evaluation platform may determine, based on the automation evaluation and a skills model, one or more skills for the entity, may determine one or more courses relating to the one or more skills, and may provide information identifying the one or more skills and the one or more courses. In some implementations, the action may include an automated training enrollment action, an automated training scheduling action, an automated role reassignment action, an automated job application action, an automated job posting action, and/or an automated job searching and reporting action.

In some implementations, the automation evaluation platform may generate a prediction of a timeline for automation of the role based on the aggregate automation score, and may provide information identifying the timeline for automation of the role. In some implementations, the entity may be prioritized for enrollment in a course based on the aggregate automation score, another entity may not be prioritized for enrollment in the course based on another aggregate automation score of the other entity, and the other aggregate automation score may be less than the aggregate automation score. In some implementations, the automation evaluation platform may provide a user interface, and may receive, based on detecting one or more interactions with the user interface, information identifying the one or more characteristics of the entity.

In some implementations, the automation evaluation platform may generate a set of user interface elements to enable a communication channel for the entity and a manager entity for the entity. In some implementations, the automation evaluation platform may selectively assign the role to the entity or for automation based on the automation evaluation.

In some implementations, the automation evaluation platform may automatically assign the one or more tasks of the role for automated completion based on the automation evaluation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
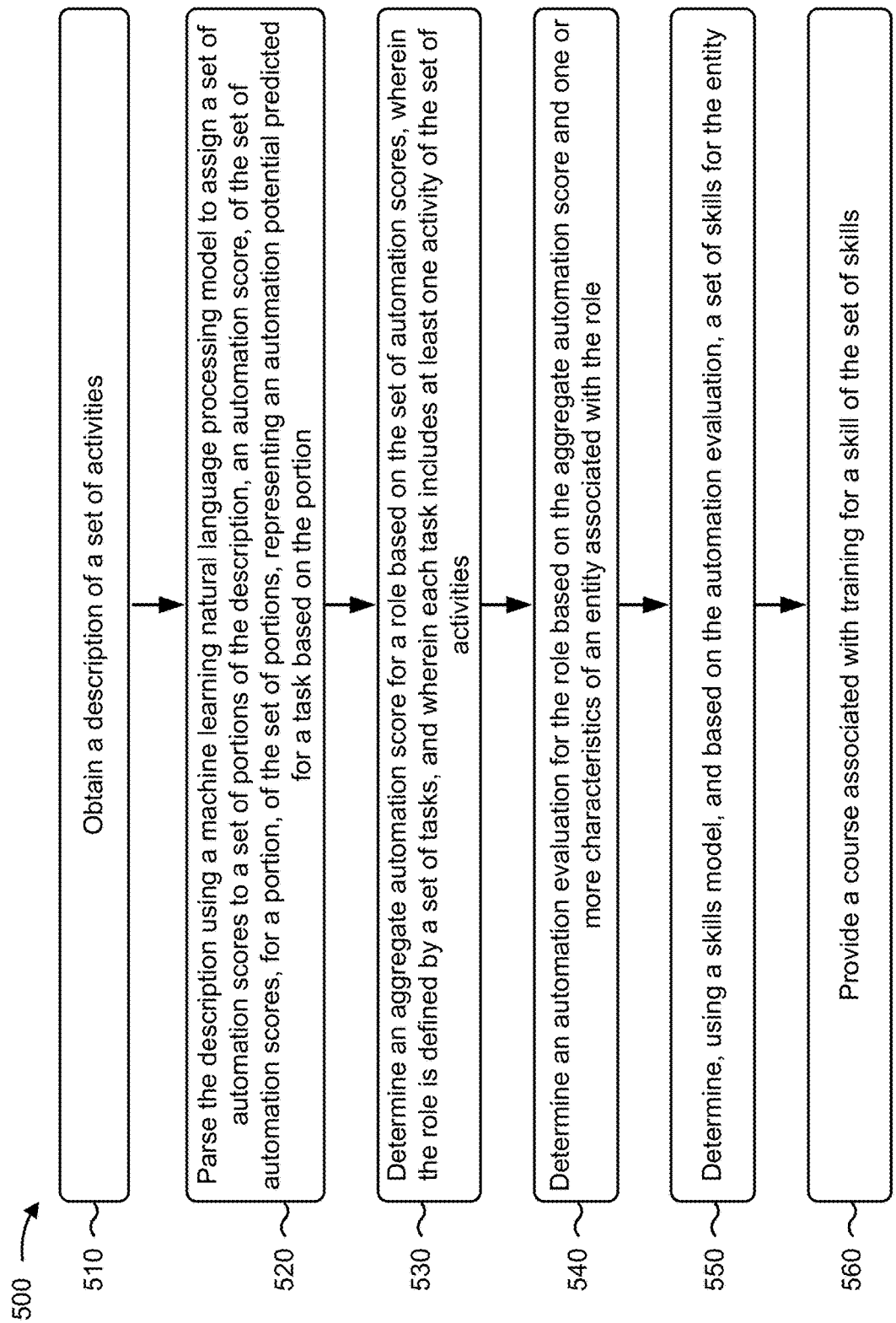
FIG. 5 is a flow chart of an example process for performing an automation evaluation.

FIG. 5 is a flow chart of an example process 500 for performing an automation evaluation. In some implementations, one or more process blocks of FIG. 5 may be performed by an automation evaluation platform (e.g. automation evaluation platform 220). In some implementations, one or more process blocks of FIG. 5 may be performed by another device or a group of devices separate from or including an automation evaluation platform (e.g. automation evaluation platform 220), such as a client device (e.g. client device 210) and/or a computing resource (e.g. computing resource 225).

As shown in FIG. 5, process 500 may include obtaining a description of a set of activities (block 510). For example, the automation evaluation platform (e.g., using computing resource 225, processor 320, memory 330, storage component 340, input component 350, communication interface 370, and/or the like) may obtain a description of a set of activities, as described above in connection with FIGS. 1A-1E.

As further shown in FIG. 5, process 500 may include parsing the description using a machine learning natural language processing model to assign a set of automation scores to a set of portions of the description, an automation score, of the set of automation scores, for a portion, of the set of portions, representing an automation potential predicted for a task based on the portion (block 520). For example, the automation evaluation platform (e.g., using computing resource 225, processor 320, memory 330, storage component 340, input component 350, communication interface 370, and/or the like) may parse the description using a machine learning natural language processing model to assign a set of automation scores to a set of portions of the description, as described above in connection with FIGS. 1A-1E. In some implementations, an automation score, of the set of automation scores, for a portion, of the set of portions, may represent an automation potential predicted for a task based on the portion.

As further shown in FIG. 5, process 500 may include determining an aggregate automation score for a role based on the set of automation scores, wherein the role is defined by a set of tasks, and wherein each task includes at least one activity of the set of activities (block 530). For example, the automation evaluation platform (e.g., using computing resource 225, processor 320, memory 330, storage component 340, and/or the like) may determine, an aggregate automation score for a role based on the set of automation scores, as described above in connection with FIGS. 1A-1E. In some implementations, the role may be defined by a set of tasks, and each task may include at least one activity of the set of activities.

As further shown in FIG. 5, process 500 may include determining an automation evaluation for the role based on the aggregate automation score and one or more characteristics of an entity associated with the role (block 540). For example, the automation evaluation platform (e.g., using computing resource 225, processor 320, memory 330, storage component 340, and/or the like) may determine an automation evaluation for the role based on the aggregate automation score and one or more characteristics of an entity associated with the role, as described above in connection with FIGS. 1A-1E.

As further shown in FIG. 5, process 500 may include determining, using a skills model, and based on the automation evaluation, a set of skills for the entity (block 550). For example, the automation evaluation platform (e.g., using computing resource 225, processor 320, memory 330, storage component 340, and/or the like) may determine, using a skills model, and based on the automation evaluation, a set of skills for the entity, as described above in connection with FIGS. 1A-1E.

As further shown in FIG. 5, process 500 may include providing a course associated with training for a skill of the set of skills (block 560). For example, the automation evaluation platform (e.g., using computing resource 225, processor 320, memory 330, storage component 340, input component 350, output component 360, communication interface 370, and/or the like) may provide a course associated with training for a skill of the set of skills, as described above in connection with FIGS. 1A-1E.

Process 500 may include additional implementations, such as any single implementation or any combination of implementations described below and/or in connection with one or more other processes described elsewhere herein.

In some implementations, the automation evaluation platform may provide information identifying the automation evaluation. In some implementations, the skills model may include an item-based collaborative filtering model, a single value decomposition model, and/or a hybrid recommendation model.

In some implementations, the automation evaluation platform may receive an automation evaluation model that has been trained using a data structure storing data regarding roles, tasks, and activities. In some implementations, when determining the automation evaluation, the automation evaluation platform may determine the automation evaluation using the automation evaluation model. In some implementations, the automation evaluation model may be trained based on data identifying task statements regarding the activities.

In some implementations, the set of skills may include an artificial intelligence skill, an internet of things skill, a blockchain skill, and/or a cyber security skill. In some implementations, the automation evaluation platform may obtain the course via a network connection with another device, and may provide the course via a user interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
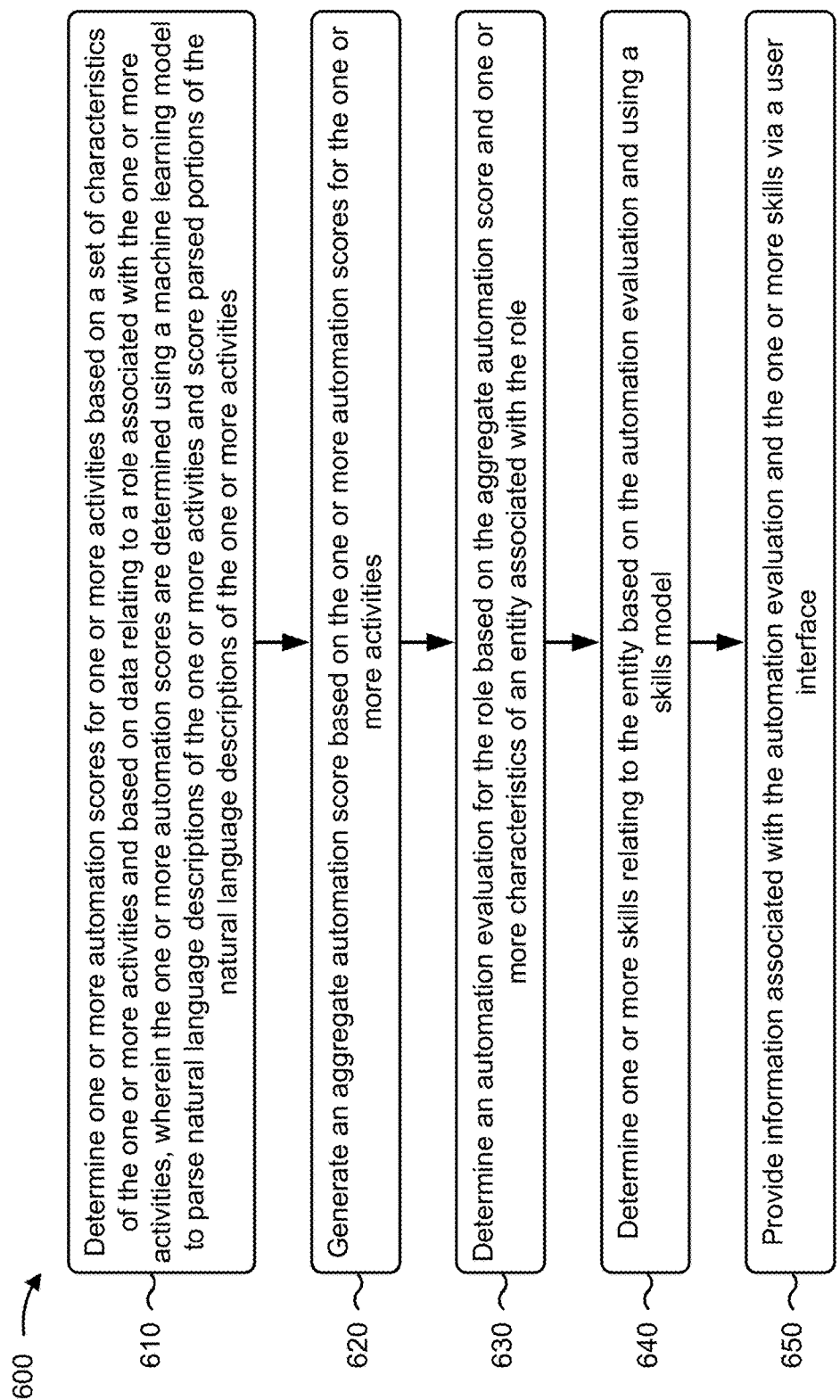
FIG. 6 is a flow chart of an example process for performing an automation evaluation.

FIG. 6 is a flow chart of an example process 600 for performing an automation evaluation. In some implementations, one or more process blocks of FIG. 6 may be performed by an automation evaluation platform (e.g. automation evaluation platform 220). In some implementations, one or more process blocks of FIG. 6 may be performed by another device or a group of devices separate from or including an automation evaluation platform (e.g. automation evaluation platform 220), such as a client device (e.g. client device 210) and/or a computing resource (e.g. computing resource 225).

As shown in FIG. 6, process 600 may include determining one or more automation scores for one or more activities based on a set of characteristics of the one or more activities and based on data relating to a role associated with the one or more activities, wherein the one or more automation scores are determined using a machine learning model to parse natural language descriptions of the one or more activities and score parsed portions of the natural language descriptions of the one or more activities (block 610). For example, the automation evaluation platform (e.g., using computing resource 225, processor 320, memory 330, storage component 340, and/or the like) may determine one or more automation scores for one or more activities based on a set of characteristics of the one or more activities and based on data relating to a role associated with the one or more activities, as described above in connection with FIGS. 1A-1E. In some implementations, the one or more automation scores may be determined using a machine learning model to parse natural language descriptions of the one or more activities and score parsed portions of the natural language descriptions of the one or more activities.

As further shown in FIG. 6, process 600 may include generating an aggregate automation score based on the one or more automation scores for the one or more activities (block 620). For example, automation evaluation platform (e.g., using computing resource 225, processor 320, memory 330, storage component 340, input component 350, communication interface 370, and/or the like) may generate an aggregate automation score based on the one or more automation scores for the one or more activities, as described above in connection with FIGS. 1A-1E.

As further shown in FIG. 6, process 600 may include determining an automation evaluation for the role based on the aggregate automation score and one or more characteristics of an entity associated with the role (block 630). For example, the automation evaluation platform (e.g., using computing resource 225, processor 320, memory 330, storage component 340, and/or the like) may determine an automation evaluation for the role based on the aggregate automation score and one or more characteristics of an entity associated with the role, as described above in connection with FIGS. 1A-1E.

As further shown in FIG. 6, process 600 may include determining one or more skills relating to the entity based on the automation evaluation and using a skills model (block 640). For example, the automation evaluation platform (e.g., using computing resource 225, processor 320, memory 330, storage component 340, and/or the like) may determine one or more skills relating to the entity based on the automation evaluation and using a skills model, as described above in connection with FIGS. 1A-1E.

As further shown in FIG. 6, process 600 may include providing information associated with the automation evaluation and the one or more skills via a user interface (block 650). For example, the automation evaluation platform (e.g., using computing resource 225, processor 320, memory 330, storage component 340, output component 360, communication interface 370, and/or the like) may provide information associated with the automation evaluation and the one or more skills via a user interface, as described above in connection with FIGS. 1A-1E.

Process 600 may include additional implementations, such as any single implementation or any combination of implementations described below and/or in connection with one or more other processes described elsewhere herein.

In some implementations, the automation evaluation platform may transmit an alert to a client device associated with a manager of the entity identifying the automation evaluation and the one or more skills. In some implementations, the automation evaluation platform may aggregate the automation evaluation and one or more other automation evaluations for a group of entities to determine a group automation evaluation identify a set of skills for the group of entities based on the group automation evaluation, and may provide information identifying the set of skills. In some implementations, the automation evaluation platform may automatically determine a set of task assignments for the group of entities based on the group automation evaluation, and may provide information identifying the set of task assignments.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a command to identify an automation evaluation for a role;
provide a user interface element to receive a natural language description of the role;
parse, using a machine learning model, the natural language description to determine one or more tasks of the role;
parse, using the machine learning model, the natural language description to determine one or more activities for the one or more tasks of the role;
train a model of activity automatability using an artificial neural network processing technique to perform pattern recognition with regard to patterns of whether the one or more activities, described using different semantic descriptions, are automatable and whether the one or more tasks of the role will be automated;
determine, using the model of activity automatability, one or more automation scores for the one or more activities, which correspond to a suitability for automation of the one or more activities, based on entity characteristic data of an entity associated with the role, data relating to the role, and organization data,
wherein the entity characteristic data includes one or more of:
information associated with one or more skills of the entity,
information associated with a level of experience of the entity,
information associated with a set of entity evaluations, or
information associated with a set of entity preferences;
generate, for the role, an aggregate automation score based on the one or more automation scores for the one or more activities;
set a first threshold, associated with the entity, for determining that the role is likely to be automated based on the aggregate automation score,
wherein the first threshold is associated with whether the entity repeats a client facing activity with a threshold frequency;
set a second threshold, associated with another entity, for determining that the role is likely to be automated based on the aggregate automation score,
wherein the second threshold is associated with whether the other entity repeats a client facing activity that does not meet the threshold frequency;
determine the automation evaluation for the role based on the aggregate automation score, the first threshold, and the entity characteristic data,
wherein the entity is prioritized for enrollment in a training course based on the aggregate automation score, and
wherein the other entity is not prioritized for enrollment in the training course based on another aggregate automation score of the other entity,
wherein the other aggregate automation score is less than the aggregate automation score;
search, based on the automation evaluation indicating a likelihood of the role being automated, an internet for the training course associated with a recommended skill,
wherein the training course is determined based on the entity characteristic data and data associated with one or more similar entities;
receive, from the internet and based on searching the internet, the training course,
the training course being a video-based course or an audio-based course,
perform an allocation of resources of a content delivery network (CDN) to distribute the training course to one or more user devices;
generate, based on receiving the training course, a user interface for providing the training course; and
provide, via the user interface and utilizing the resources of the CDN, the training course to the one or more user devices.

2. The device of claim 1, wherein the one or more processors are further to:
determine, based on the automation evaluation and a skills model, the one or more skills of the entity,
the one or more skills including the recommended skill;
determine one or more courses relating to the one or more skills,
the one or more courses including the training course; and
provide information identifying the one or more skills and the one or more courses.

3. The device of claim 1, wherein the one or more processors are further to:
perform, based on the automation evaluation, at least one of:
an automated training enrollment action,
an automated training scheduling action,
an automated role reassignment action,
an automated job application action,
an automated job posting action, or
an automated job searching and reporting action.

4. The device of claim 1, wherein the one or more processors are further to:
generate a prediction of a timeline for automation of the role based on the aggregate automation score; and
provide information identifying the timeline for automation of the role.

5. The device of claim 1, wherein the one or more processors are further to:
provide the user interface; and
receive, based on detecting one or more interactions with the user interface, information identifying the entity characteristic data.

6. The device of claim 1, wherein the one or more processors are further to:

generate a set of user interface elements to enable a communication channel for the entity and a manager entity for the entity.

7. The device of claim 1, wherein the one or more processors are further to:

selectively assign the role to the entity or for automation based on the automation evaluation.

8. The device of claim 1, wherein the one or more processors are further to:

automatically assign the one or more tasks of the role for automated completion based on the automation evaluation.

9. The device of claim 1, wherein the entity characteristic data further includes one or more of:

information associated with one or more timesheets associated with the entity, or information associated with computer usage associated with the entity.

10. A method, comprising:

providing, by a device, a user interface element to receive a natural language description of a role;

parsing, by the device and using a machine learning model, the natural language description to determine a set of tasks of the role;

parsing, by the device and using the machine learning model, the natural language description to determine a set of activities for the set of tasks;

training, by the device, a model of activity automatability using an artificial neural network processing technique to perform pattern recognition with regard to patterns of whether the set of activities, described using different semantic descriptions, are automatable and whether the set of tasks will be automated;

determining, by the device and using the model of activity automatability, a set of automation scores for the set of activities, an automation score, of the set of automation scores, representing an automation potential predicted for a task of the set of tasks, and the set of automation scores being determined based on entity characteristic data of an entity associated with the role, data relating to the role, and organization data, wherein the entity characteristic data includes one or more of:

information associated with one or more skills of the entity, information associated with a level of experience of the entity, information associated with a set of entity evaluations, or information associated with a set of entity preferences;

determining, by the device, an aggregate automation score for the role based on the set of automation scores, wherein the role is defined by the set of tasks, and wherein each task, of the set of tasks, includes at least one activity of the set of activities;

setting, by the device, a first threshold, associated with the entity, for determining that the role is likely to be automated based on the aggregate automation score, wherein the first threshold is associated with whether the entity repeats a client facing activity with a threshold frequency;

setting, by the device, a second threshold, associated with another entity, for determining that the role is likely to be automated based on the aggregate automation score, wherein the second threshold is associated with whether the other entity repeats a client facing activity that does not meet the threshold frequency;

determining, by the device, an automation evaluation for the role based on the aggregate automation score, the first threshold, and the entity characteristic data, wherein the entity is prioritized for enrollment in a training course based on the aggregate automation score, and wherein the other entity is not prioritized for enrollment in the training course based on another aggregate automation score of the other entity, wherein the other aggregate automation score is less than the aggregate automation score;

searching, by the device, using a skills model, and based on the automation evaluation indicating a likelihood of the role being automated, an internet for the training course associated with a skill, of a set of skills, for the entity, wherein the training course is determined based on the entity characteristic data and data associated with one or more similar entities;

receiving, by the device, from the internet, and based on searching the internet, the training course, the training course being a video-based course or an audio-based course, performing, by the device, an allocation of resources of a content delivery network (CDN) to distribute the training course to one or more user devices;

generating, by the device and based on receiving the training course, a user interface for providing the training course; and providing, by the device, via the user interface, and using the resource of the CDN, the training course to the one or more user devices.

11. The method of claim 10, further comprising:

providing, via the user interface, information identifying the automation evaluation.

12. The method of claim 10, wherein the skills model is at least one of:

an item-based collaborative filtering model, a single value decomposition model, or a hybrid recommendation model.

13. The method of claim 10, further comprising:

receiving an automation evaluation model that has been trained using a data structure storing data regarding roles, tasks, and activities; and wherein determining the automation evaluation comprises:

determining the automation evaluation using the automation evaluation model.

14. The method of claim 13, wherein the automation evaluation model is trained based on data identifying task statements regarding the activities.

15. The method of claim 10, wherein the set of skills includes at least one of:

an artificial intelligence skill, an internet of things skill, a blockchain skill, or a cyber security skill.

16. The method of claim 10, further comprising:

updating the user interface to include a chat functionality.

17. A non-transitory computer-readable medium storing instructions, the instructions comprising:

one or more instructions that, when executed by one or more processors, cause the one or more processors to:
provide a user interface element to receive a natural language description of a role;
parse, using a machine learning model, the natural language description to determine one or more tasks of the role;
parse, using the machine learning model, the natural language description to determine one or more activities for the one or more tasks;
train a model of activity automatability using an artificial neural network processing technique to perform pattern recognition with regard to patterns of whether the one or more activities, described using different semantic descriptions, are automatable and whether the one or more tasks will be automated;
determine, using the model of activity automatability, one or more automation scores for the one or more activities based on entity characteristic data of an entity associated with the role, data relating to the role, and organization data,
wherein the entity characteristic data includes one or more of:
information associated with one or more skills of the entity,
information associated with a level of experience of the entity,
information associated with a set of entity evaluations, or
information associated with a set of entity preferences;
generate, for the role, an aggregate automation score based on the one or more automation scores for the one or more activities;
set a first threshold, associated with the entity, for determining that the role is likely to be automated based on the aggregate automation score,
wherein the first threshold is associated with whether the entity repeats a client facing activity with a threshold frequency;
set a second threshold, associated with another entity, for determining that the role is likely to be automated based on the aggregate automation score,
wherein the second threshold is associated with whether the other entity repeats a client facing activity that does not meet the threshold frequency
determine an automation evaluation for the role based on the aggregate automation score, the first threshold, and the entity characteristic data,
wherein the entity is prioritized for enrollment in a training course based on the aggregate automation score, and
wherein the other entity is not prioritized for enrollment in the training course based on another aggregate automation score of the other entity,
wherein the other aggregate automation score is less than the aggregate automation score;
determine the one or more skills relating to the entity based on the automation evaluation and using a skills model;
search, based on the automation evaluation indicating a likelihood of the role being automated, an internet for the training course associated with the one or more skills,
wherein the training course is determined based on the entity characteristic data and data associated with one or more similar entities;
receive, from the internet and based on searching the internet, the training course,
the training course being a video-based course or an audio-based course,
perform an allocation of resources of a content delivery network (CDN) to distribute the training course to one or more user devices;
generate, based on receiving the training course, a user interface for providing the training course; and
provide, via the user interface and utilizing the resources of the CDN, the training course to the one or more user devices.

18. The non-transitory computer-readable medium of claim 17, wherein the one or more instructions, when executed by the one or more processors, further cause the one or more processors to:
transmit an alert to a client device associated with a manager of the entity identifying the automation evaluation and the one or more skills.

19. The non-transitory computer-readable medium of claim 17, wherein the one or more instructions, when executed by the one or more processors, further cause the one or more processors to:
aggregate the automation evaluation and one or more other automation evaluations for a group of entities to determine a group automation evaluation;
identify a set of skills for the group of entities based on the group automation evaluation; and
provide information identifying the set of skills.

20. The non-transitory computer-readable medium of claim 19, wherein the one or more instructions, when executed by the one or more processors, further cause the one or more processors to:
automatically determine a set of task assignments for the group of entities based on the group automation evaluation; and
provide information identifying the set of task assignments.

* * * * *